United States Patent
Heineke et al.

(10) Patent No.: US 6,919,550 B2
(45) Date of Patent: Jul. 19, 2005

(54) DETECTOR FOR SHORT WAVE FIBER OPTIC COMMUNICATIONS WITH COMPENSATION TO REDUCE DETECTOR JITTER

(75) Inventors: Randolph B. Heineke, Rochester, MN (US); David John Orser, Farmington, MN (US)

(73) Assignee: JDS Uniphase Corporation, San Jose, CA (US)

( * ) Notice: Subject to any disclaimer, the term of this patent is extended or adjusted under 35 U.S.C. 154(b) by 758 days.

(21) Appl. No.: 09/994,229

(22) Filed: Nov. 27, 2001

(65) Prior Publication Data

US 2003/0099021 A1 May 29, 2003

(51) Int. Cl.[7] .............................................. H01J 40/14
(52) U.S. Cl. .............................. 250/214 R; 250/214 C; 250/214 A; 327/514
(58) Field of Search ......................... 250/214 R, 214 A, 250/214 LA, 214 AG, 214 C, 214 RC, 214.1, 227.11; 327/514, 515; 330/252–257, 308, 59, 110

(56) References Cited

U.S. PATENT DOCUMENTS 5,966,387 A * 10/1999 Cloutier ...................... 370/516

OTHER PUBLICATIONS

U.S. Appl. No. 09/995,108, filed Nov. 27, 2001, by Randolph B. Heineke and David John Orser entitled "Fiber Optic Transceiver Array and Fiber Optic Transceiver Channel for Short Wave Fiber Optic Communications".

U.S. Appl. No. 09/995,107, filed Nov. 27, 2001, by Randolph B. Heineke and David W. Siljenberg entitled "Fiber Optic Transceiver Array for Implementing Testing".

* cited by examiner

Primary Examiner—Kevin Pyo
(74) Attorney, Agent, or Firm—Allen, Dyer, Doppelt & Milbrath & Gilchrist, P.A.

(57) ABSTRACT

A detector is provided for short wave fiber optic communication having compensation to reduce detector jitter. The detector includes a photodetector providing a modulated current. A transimpedance amplifier is coupled to the photodetector receiving the modulated current and providing an output voltage signal. An output buffer is coupled to the transimpedance amplifier receiving the output voltage signal. The output buffer includes a differential transistor pair; a pair of source degeneration resistors connected to the differential transistor pair; and a capacitor coupled between connections of the differential transistor pair and the source degeneration resistors. The value of the capacitor coupled between connections of the differential transistor pair and the source degeneration resistors is selected to reduce jitter. The capacitor passes high slew rate transimpedance amplifier output voltage signals more readily than low slew rate transimpedance amplifier output voltage signals. The effect of the capacitor is to bypass the gain limiting effects of the source degeneration resistors. As a result the differential transistor pair accentuates high slew rates over lower ones so that detector jitter is reduced.

20 Claims, 2 Drawing Sheets

DETECTOR FOR SHORT WAVE FIBER OPTIC COMMUNICATIONS WITH COMPENSATION TO REDUCE DETECTOR JITTER

RELATED APPLICATIONS

Related United States patent applications assigned to the present assignee are being filed on the same day as the present patent application including:

U.S. patent application Ser. No. 09/995,107, entitled "FIBER OPTIC TRANSCEIVER ARRAY FOR IMPLEMENTING TESTING" by Randolph B. Heineke and David W. Siljenberg; and U.S. patent application Ser. No. 09/995,108, entitled "FIBER OPTIC TRANSCEIVER ARRAY AND FIBER OPTIC TRANSCEIVER CHANNEL FOR SHORT WAVE FIBER OPTIC COMMUNICATIONS" by Randolph B. Heineke and David John Orser.

FIELD OF THE INVENTION

The present invention relates generally to the communications field, and more particularly, relates to a detector for short wave fiber optic communications having compensation to reduce detector jitter.

DESCRIPTION OF THE RELATED ART

Demand for bandwidth in data communications appears to be generally unlimited. One of the economic considerations to meet this demand is to minimize the physical size of fiber optic transceivers. One known arrangement uses an array of integrated photodetector and preamplifiers to reduce the number of components and connections in the fiber optic transceivers and gain benefits of compactness.

Photodetectors can be vertical or lateral structures. Lateral structures are more attractive to integrate. Vertical structures have better jitter characteristics. Lateral structures can be formed using the same processing steps as accompanying analog circuitry. Vertical detectors alone require specialized processing steps. Integrating vertical structures with analog circuitry is unattractive due to the processing steps required and attendant increased manufacturing cost. This is especially true for larger array chip sizes and the attendant yields of larger array chips.

In the lateral photodetector, jitter is most significant constraint on high speed operation. Lateral photodetector jitter is largely a result of the photodetector geometry. On the surface the lateral detector has excellent high speed characteristics, the fields to sweep photo carriers to the collecting points are strong and the carriers are quickly removed. However, photons that penetrate more deeply generate photo carriers that encounter weaker fields and are collected more slowly. Other mechanisms that lead to jitter can include trap states and photo carrier generation in undepleted regions.

A need exists for a detector for short wave fiber optic communications having compensation to reduce detector jitter. Compensating for lateral photodetector jitter is particularly desirable for a fiber optic transceiver array.

SUMMARY OF THE INVENTION

A principal object of the present invention is to provide a detector for short wave fiber optic communications having compensation to reduce detector jitter. Other important objects of the present invention are to provide such detector for short wave fiber optic communication having compensation to reduce detector jitter substantially without negative effect and that overcome many of the disadvantages of prior art arrangements.

In brief, a detector is provided for short wave fiber optic communications having compensation to reduce detector jitter. The detector includes a photodetector providing a modulated current. A transimpedance amplifier is coupled to the photodetector receiving the modulated current and providing an output voltage signal. An output buffer is coupled to the transimpedance amplifier receiving the output voltage signal. The output buffer includes a differential transistor pair; a pair of source degeneration resistors connected to the differential transistor pair; and a capacitor coupled between connections of the differential transistor pair and the source degeneration resistors. The value of the capacitor coupled between connections of the differential transistor pair and the source degeneration resistors is selected to reduce jitter.

In accordance with features of the invention, the capacitor passes high slew rate transimpedance amplifier output voltage signals more readily than low slew rate transimpedance amplifier output voltage signals. The effect of the capacitor is to bypass the gain limiting effects of the source degeneration resistors. As a result the differential transistor pair accentuates high slew rates over lower ones so that detector jitter is reduced.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
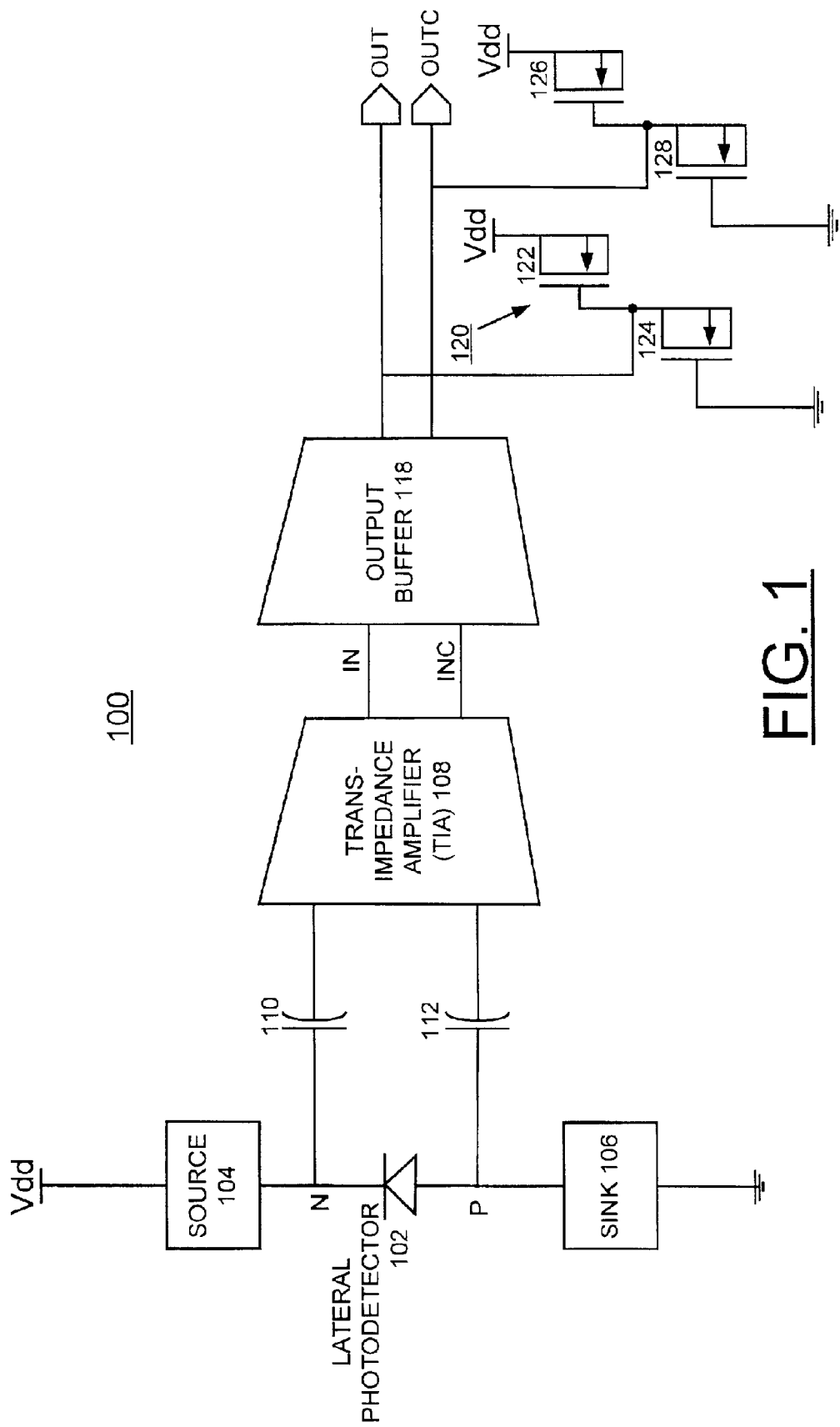
FIG. 1 is a schematic and block diagram illustrating a detector for short wave fiber optic communications in accordance with the preferred embodiment.

Having reference now to the drawings, in FIG. 1, there is shown a detector for short wave fiber optic communications generally designated by the reference character 100 in accordance with the preferred embodiment. Fiber optic communications detector 100 of the preferred embodiment includes compensation to reduce detector jitter.

Fiber optic communications detector 100 includes a photodetector 102 biased by a source current source 104 and a sink current source 106. Photodetector 102 of the preferred embodiment is a lateral structure, such as a lateral PIN photodiode structure. Photodetector 102 detects a light input applied, for example, via an optical fiber (not shown) and provides a modulated current output. Modulated current is fed to a transimpedance amplifier (TIA) 108 via a pair of capacitors 110, 112. Capacitors 110, 112 are AC coupling capacitors adapted for passing high frequency and blocking low frequency signals. Transimpedance amplifier (TIA) 108 provides a voltage signal output indicated at lines labeled IN and INC. The voltage output IN and INC of the transimpedance amplifier 108 is applied to an output buffer stage 118. The output buffer 118 the preferred embodiment provides compensation to reduce detector jitter of the lateral photodetector 102. The output buffer 118 the preferred embodiment is illustrated and described with respect to FIG. 2.

Differential outputs OUT, OUTC from the buffer stage 118 are connected to an electrostatic discharge (ESD) channel protection circuit 120. ESD channel protection circuit 120 includes a plurality of metal semiconductor field effect transistors (MESFETS) 122, 124, 126 and 128, as shown. MESFETs 122, 124, 126 and 128 have a diode arrangement for implementing ESD protection of the outputs OUT, OUT_C from the buffer stage 118. A respective output OUT, OUTC from the buffer stage 118 is applied to a respectively applied to a gate input of metal semiconductor field effect transistors (MESFETs) 122, 126 and respectively applied to a drain input of MESFETs 124, 128 having a gate input connected to ground. A drain of NFETs 122 and 124 is connected to a high voltage supply Vdd. The respective drain and source of MESFETs 122, 124, 126 and 128 are connected together.

In accordance with features of the preferred embodiment, some of the repeatable portion of the photodetector jitter is effectively removed. The response of a lateral photodetector 102 is at first very sudden but incomplete. The slow carriers, which arrive later, eventually add to the response. Fiber optic communications detector 100 emphasizes sudden rises and falls of photocurrent while providing less emphasis on lower slow rates to remove jitter. The output buffer 118 of the preferred embodiment of the fiber optic transceiver channel 100 provides effective compensation for effectively minimizing or removing the photodetector jitter.

Figure 2:
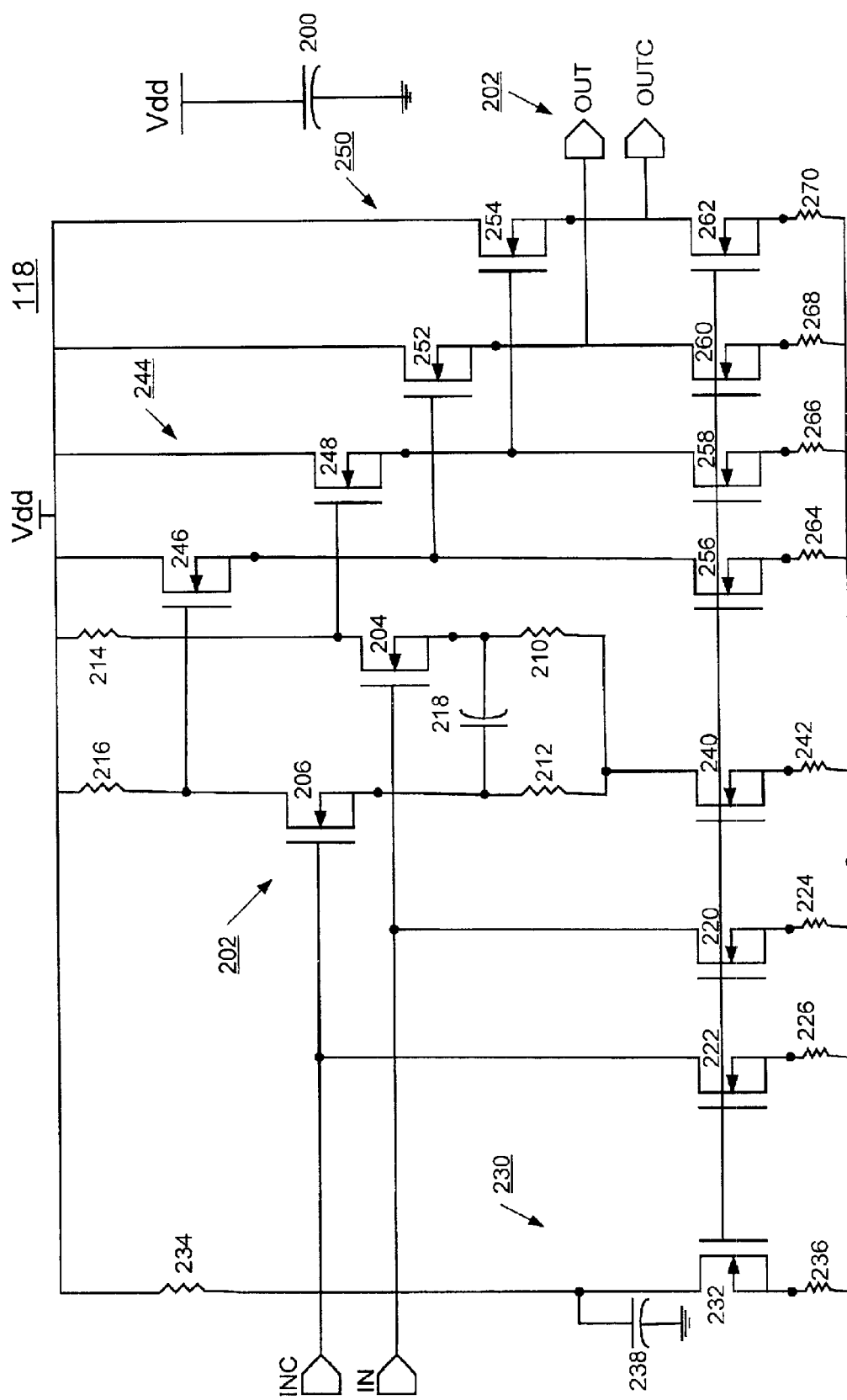
FIG. 2 is a schematic diagram illustrating output buffer circuitry of the detector for short wave fiber optic communications of FIG. 1 in accordance with the preferred embodiment.

Referring now to FIG. 2, the output buffer 118 of the fiber optic transceiver channel 100 is shown. A channel decoupling capacitor 200 is strategically positioned relative to the channel differential outputs OUT and OUTC of the output buffer stage 118 for power noise sensitivity reduction. The output buffer stage 118 is operated differentially to reduce generation of and susceptibility to noise.

An input stage of the buffer stage 118 consists of a differential transistor pair 202. Differential transistor pair 202 is defined by a pair of metal semiconductor field effect transistors (MESFETs) 204 and 206. Differential transistor pair 202 is a high gain amplifier adapted for providing detector jitter compensation. Output buffer stage 118 receives voltage inputs IN and INC respectively applied to a gate input the of high gain metal semiconductor field effect transistors (MESFETs) 204 and 206.

Input stage differential transistor pair 202 of MESFETs 204 and 206 includes a pair of source degeneration resistors 210 and 212 to control the gain. A pair of load resistors 214 and 216 is connected between the drain of MESFETs 204 and 206 and a high voltage supply Vdd. Connected between the junction connections of the source of respective MESFETs 204 and 206 and source degeneration resistors 210 and 212 is a capacitor 218. Capacitor 218 is provided for effectively removing the photodetector jitter in accordance with the preferred embodiment.

The value of capacitor 218 is selected to minimize jitter. The capacitor 218 passes high slew rate signals more readily than low slew rate signals. The effect of the capacitor 218 is to bypass the gain limiting effects of the source degeneration resistors 210 and 212. As a result, differential pair 202 is arranged to accentuate high slew rates over lower slew rates.

A pair of current source MESFETs 220 and 222 are connected between differential inputs IN and INC and ground via source resistor 224 and 226. A current source reference 230 is connected to the current source MESFETs 220 and 222. A MESFET 232, a drain resistor 234, a source resistor 236 and a capacitor 238 form the current source reference 230. MESFET 232 is connected between the high voltage Vdd and ground via drain and source resistors 234 and 236. Capacitor 238 is connected between the drain of MESFET 232 and ground. A gate of current source MESFETs 220 and 222 is connected to the gate of current source reference MESFET 232.

A current source MESFET 240 having a source resistor 242 is connected between the source degeneration resistors 210 and 212 and ground. A gate of current source MESFET 240 is connected to the gate of current source reference MESFET 232.

Output buffer stage 118 includes a first source follower pair 244 of MESFETs 246 and 248 having a respective gate connected to the drain of differential pair MESFETs 206 and 208 and a second source follower pair 250 of MESFETs 252 and 254 having a respective gate connected to the source of first source follower pair 244 of MESFETs 246 and 248. The first and second source follower pairs 244 and 250 provide a unity gain stage. A plurality of current source MESFETS 256, 258, 260 and 262 each having a respective source resistor 264, 266, 268 and 270 are connected to the first and second source follower pair MESFETs 246, 248, 252 and 254. A gate of current source MESFETs 256, 258, 260 and 262 is connected to the gate of current source reference MESFET 232. The source of MESFETs 252 and 254 of the second source follower pair 250 provide the differential outputs OUT and OUTC of the output buffer circuitry 114 of the fiber optic transceiver channel 100.

It should be understood that the present invention is not limited to the use of metal semiconductor field effect transistors (MESFETs) as shown in FIGS. 1 and 2. It should be understood that the fiber optic transceiver channel 100 including output buffer 118 of the preferred embodiment could be implemented, for example, with bipolar transistors, N-channel field effect transistors or P-channel field effect transistors.

While the present invention has been described with reference to the details of the embodiments of the invention shown in the drawing, these details are not intended to limit the scope of the invention as claimed in the appended claims.

What is claimed is:

1. A detector for short wave fiber optic communications having compensation to reduce detector jitter comprising:
    a photodetector for providing a modulated current;
    a transimpedance amplifier coupled to said photodetector receiving said modulated current and providing an output voltage signal;
    an output buffer coupled to said transimpedance amplifier receiving said output voltage signal; and
    said output buffer including a differential transistor pair; said transimpedance amplifier output voltage signal applied to said differential transistor pair; a pair of source degeneration resistors connected to said differential transistor pair; and a capacitor coupled between connections of said differential transistor pair and said source degeneration resistors; said capacitor having a selected value for reducing detector jitter.

2. A detector for short wave fiber optic communications having compensation to reduce detector jitter as recited in claim 1 wherein said differential transistor pair is a high gain amplifier and is responsive to said applied transimpedance amplifier output voltage signal for accentuating high slew rates over lower slew rates.

3. A detector for short wave fiber optic communications having compensation to reduce detector jitter as recited in claim 1 wherein said capacitor passes high slew rate transimpedance amplifier output voltage signals and limits low slew rate transimpedance amplifier output voltage signals.

4. A detector for short wave fiber optic communications having compensation to reduce detector jitter as recited in claim 1 wherein said photodetector includes a lateral photodetector structure.

5. A detector for short wave fiber optic communications having compensation to reduce detector jitter as recited in claim 1 includes a current source and a current sink for biasing said photodetector.

6. A detector for short wave fiber optic communications having compensation to reduce detector jitter as recited in claim 1 wherein said transimpedance amplifier output voltage signal applied to said differential transistor pair is a differential output voltage signal and said output buffer providing a differential detector voltage signal.

7. A detector for short wave fiber optic communications having compensation to reduce detector jitter as recited in claim 1 wherein said pair of source degeneration resistors connected to said differential transistor pair control gain of said differential transistor pair.

8. A detector for short wave fiber optic communications having compensation to reduce detector jitter as recited in claim 1 wherein said output buffer includes a pair of drain load resistors connected between said differential transistor pair and a high power supply voltage.

9. A detector for short wave fiber optic communications having compensation to reduce detector jitter as recited in claim 1 wherein said differential transistor pair is formed by a pair of metal semiconductor field effect transistors (MESFETs).

10. A detector for short wave fiber optic communications having compensation to reduce detector jitter as recited in claim 1 further includes AC coupling capacitors coupled between said photodetector and said transimpedance amplifier.

11. A detector for short wave fiber optic communications having compensation to reduce detector jitter comprising:
 a lateral photodetector biased by a current source and a current sink for providing a modulated current signal;
 a transimpedance amplifier coupled to said lateral photodetector receiving said modulated current signal and providing a differential output voltage signal;
 an output buffer coupled to said transimpedance amplifier receiving said differential output voltage signal; and
 said output buffer including a differential transistor pair; said differential output voltage signal of said transimpedance amplifier applied to said differential transistor pair; a pair of source degeneration resistors connected to said differential transistor pair; and a capacitor coupled between connections of said differential transistor pair and said source degeneration resistors; said capacitor having a selected value to reduce detector jitter; and said capacitor passing high slew rate signals and limiting low slew rate signals.

12. A detector for short wave fiber optic communications having compensation to reduce detector jitter as recited in claim 11 wherein said differential transistor pair is a high gain amplifier and is responsive to said applied differential output voltage signal for accentuating high slew rates over lower slew rates.

13. A detector for short wave fiber optic communications having compensation to reduce detector jitter as recited in claim 11 wherein said output buffer includes a pair of drain load resistors connected between said differential transistor pair and a high power supply voltage.

14. A detector for short wave fiber optic communications having compensation to reduce detector jitter as recited in claim 11 wherein said output buffer includes a current source connected between said pair of source degeneration resistors and ground.

15. A detector for short wave fiber optic communications having compensation to reduce detector jitter as recited in claim 11 wherein said differential transistor pair is formed by a pair of high gain metal semiconductor field effect transistors (MESFETs).

16. A detector for short wave fiber optic communications having compensation to reduce detector jitter as recited in claim 11 wherein said output buffer includes a unity gain source follower amplifier coupled to said differential transistor pair.

17. A detector for short wave fiber optic communications having compensation to reduce detector jitter as recited in claim 11 wherein said output buffer includes a current reference source and a current source coupled to said current reference source and connected between said pair of source degeneration resistors and ground.

18. A detector for short wave fiber optic communications having compensation to reduce detector jitter as recited in claim 11 includes AC coupling capacitors coupled between said lateral photodetector and said transimpedance amplifier; said AC coupling capacitors for passing predefined frequency modulated current signals and blocking low frequency modulated current signals.

19. A buffer circuit for a signal detector having compensation to reduce detector jitter comprising:
 a differential transistor pair;
 a voltage signal applied to said differential transistor pair;
 a pair of source degeneration resistors connected to said differential transistor pair; and
 a capacitor coupled between connections of said differential transistor pair and said source degeneration resistors; said capacitor having a selected value for reducing detector jitter.

20. A buffer circuit for a signal detector having compensation to reduce detector jitter as recited in claim 19 wherein said differential transistor pair is formed by a pair of high gain metal semiconductor field effect transistors (MESFETs).

* * * * *